(12) United States Patent
Ritter et al.

(10) Patent No.: US 11,007,473 B2
(45) Date of Patent: May 18, 2021

(54) REMOVAL OF WATER VAPOR FROM STREAMS CONTAINING CARBON DIOXIDE AND/OR CARBON MONOXIDE

(71) Applicant: UNIVERSITY OF SOUTH CAROLINA, Columbia, SC (US)

(72) Inventors: James A. Ritter, Lexington, SC (US); Armin D. Ebner, Lexington, SC (US)

(73) Assignee: University of South Carolina, Columbia, SC (US)

(*) Notice: Subject to any disclaimer, the term of this patent is extended or adjusted under 35 U.S.C. 154(b) by 169 days.

(21) Appl. No.: 16/506,208

(22) Filed: Jul. 9, 2019

(65) Prior Publication Data

US 2020/0009494 A1    Jan. 9, 2020

Related U.S. Application Data

(60) Provisional application No. 62/695,450, filed on Jul. 9, 2018.

(51) Int. Cl.
*B01D 53/04* (2006.01)
*B01D 53/047* (2006.01)
(Continued)

(52) U.S. Cl.
CPC .......... *B01D 53/047* (2013.01); *B01D 33/44* (2013.01); *B01D 53/06* (2013.01); *B01D 53/78* (2013.01)

(58) Field of Classification Search
CPC ........ B01D 33/44; B01D 33/48; B01D 53/02; B01D 53/047; B01D 53/06; B01D 53/78
(Continued)

(56) References Cited

U.S. PATENT DOCUMENTS 2,944,627 A    7/1960  Skarstrom
3,140,931 A *  7/1964  McRobbie ........... B01D 53/047
                                              95/106
(Continued)

FOREIGN PATENT DOCUMENTS

EP    0904825     3/1999
EP    1221337     7/2002
(Continued)

OTHER PUBLICATIONS

Aaron, et al. "Separation of $CO_2$ from flue gas: a review" *Sep. Sci. Tech.* 40(2005) pp. 321-348.
(Continued)

*Primary Examiner* — Robert A Hopkins
(74) *Attorney, Agent, or Firm* — Dority & Manning, P.A.

(57) ABSTRACT

Methods and systems for removing water vapor from a feed gas prior to further processing the feed gas according to a downstream PSA process are described. The feed gas can include $CO_2$ and/or CO and/or $H_2$ and the PSA process can be used to separate components of the feed gas from one another, for instance, for $CO_2$ capture. Light product off of the PSA process is utilized to regenerate desiccant of a dryer used in the water vapor removal process that is carried out prior to the feed gas entering the PSA process. The water vapor removal process can be heated by providing thermal energy directly to the dryer and/or to a regenerating stream that regenerates the desiccant of the dryer. The thermal energy can be low cost energy—for instance, waste heat off of a system that provides the feed gas.

20 Claims, 7 Drawing Sheets

(51) Int. Cl.
  *B01D 53/78* (2006.01)
  *B01D 33/44* (2006.01)
  *B01D 53/06* (2006.01)

(58) Field of Classification Search
  USPC .......................................................... 95/96
  See application file for complete search history.

(56) References Cited

U.S. PATENT DOCUMENTS

| | | | |
|---|---|---|---|
| 4,439,213 A * | 3/1984 | Frey ..................... | C01B 21/045 95/98 |
| 4,726,815 A | 2/1988 | Hashimoto et al. | |
| 4,840,647 A | 6/1989 | Hay | |
| 4,892,565 A | 1/1990 | Schmidt et al. | |
| 4,915,711 A | 4/1990 | Kumar | |
| 5,026,406 A | 6/1991 | Kumar | |
| 5,248,322 A | 9/1993 | Kumar | |
| 5,354,346 A | 10/1994 | Kumar | |
| 5,779,767 A | 7/1998 | Golden et al. | |
| 5,917,136 A | 6/1999 | Gaffney et al. | |
| 6,245,127 B1 | 6/2001 | Kane et al. | |
| 6,322,612 B1 | 11/2001 | Sircar et al. | |
| 6,454,838 B1 | 9/2002 | Xu et al. | |
| 7,384,574 B2 | 6/2008 | Zidan et al. | |
| 8,153,554 B2 | 4/2012 | Ritter et al. | |
| 9,016,084 B2 | 4/2015 | Alden et al. | |
| 2005/0032641 A1 | 2/2005 | Ritter et al. | |
| 2009/0142258 A1 | 6/2009 | Ritter et al. | |
| 2011/0218099 A1 | 9/2011 | Ritter et al. | |
| 2012/0324931 A1 | 12/2012 | Alden et al. | |
| 2014/0370576 A1 | 12/2014 | Wright et al. | |

FOREIGN PATENT DOCUMENTS

| | | |
|---|---|---|
| WO | WO 2009/073928 | 6/2009 |
| WO | WO 2009/126607 | 10/2009 |

OTHER PUBLICATIONS

Bhadra, et al. "On the Use of the Dual Process Langmuir Model for Predicting Unary and Binary Isosteric Heats of Adsorption" *Langmuir* 28 (2012) pp. 6935-6941.
Brown, et al. "Using Krylov Methods in the Solution of Large Scale Differential-Algebraic Systems" *SIAM J. Stat. Comp.* 15 (1994) pp. 1467-1488.
Cen, et al. "Bulk gas separation by pressure swing adsorption" *Ind. Eng. Chem. Fundam.* 25(4) (1986) pp. 758-767.
Ebner, et al. "Graphical Unit Block Approach for Complex PSA Cycle Scheduling of Parallel Interacting Trains of Columns and Tanks" 21 *Adsoprtion* (2015) pp. 229-241.
Ebner, et al. "Graphical Approach for Complex PSA Cycle Scheduling" *Adsorption* 15 (2009) pp. 406-421. (Abstract only).
Ebner, et al. "State-of-the-Art Adsorption and Membrane Separation Processes for Carbon Dioxide Production from Carbon Dioxide Emitting Industries" *Separation Science and Technology* 44 (2009) pp. 1273-1421.
EPA. "Emissions & Generation Resource Integrated Database (eGRID)" *U.S. Environmental Protection Agency* (2007).

Erden, et al. "Development of a Pressure Swing Adsorption Cycle for Producing High Purity CO2 from Dilute Feed Streams. Part I: Feasibility Study" *Ind. Eng. Chem. Res.* 57 (2018) pp. 8011-8022.
Erden, H. "Two-Stage PSA System for $CO_2$ Removal and Concentration During Closed-Loop Human Space Exploration Missions" *U. S. Carolina* (2016) pp. 1-213.
Fenske, et al. "Human Breath Emissions of VOCs" *J. Air & Waste Manage. Assoc.* 49 (1999) pp. 594-598.
Griffiths, et al. "Area of Interest. B2: Bench-Scale Development and Testing of Rapid PSA for $CO_2$ Capture" *US Dept. of Energy* DE-FOA-0000403 (2011) pp. 1-74.
IEA. "World Energy Outlook" *Intl. Energy Agency* (2009) pp. 1-698.
Knox, et al. "Integrated Test and Evaluation of a 4-Bed Molecular Sieve (4BMS) Carbon Dioxide Removal System (CDRA), Mechanical Compressor Engineering Development Unit (EDU), and Sabatier Engineering Development Unit (EDU)" *Intl Conf Environ Sys* (2005).
Kohl, et al. "Gas Purification" *Gulf Publishing Company* (1997) pp. 1-1409.
Lee, et al. "A Review on Solid Adsorbents for Carbon Dioxide Capture" *J Indust Eng Chem* 23 (2015) pp. 1-11.
Li, N.N. "Recent Developments in Separation Science" *CRC Press* (1972).
Liu, et al. "Pressure Swing Adsorption-Solvent Vapor Recovery: Process Dynamics and Parametric Study" *Ind. Eng. Chem. Res.* 35 (1996) pp. 2299-2312.
Mehrotra, et al. "Arithmetic Approach for Complex PSA Cycle Scheduling" *Adsorption* 16 (2010) pp. 113-126.
Mohammadi, et al. "New PSA Cycle Schedules for Producing High Purity Oxygen Using Carbon Molecular Sieve" *Ind. Eng. Chem. Res.* 55 (2016) pp. 10758-10770.
Reynolds, et al. "Heavy Reflux PSA Cycles for $CO_2$ Recovery from Flue Gas. Part I. Performance Evaluation" *Adsorption* 14 (2008) pp. 399-413.
Riboldi, et al. "Overview on Pressure Swing Adsorption (PSA) as $CO_2$ Capture Technology: State-of-the-Art, Limits and Potentials" *Energy Procedia* 114 (2017) pp. 2390-2400.
Ritter, et al. "Hybrid Adsorption Process and Flow Sheet for $CO_2$ Capture from Flue Gas" *U. S. Carolina* (2014) pp. 1-42.
Ritter, et al. "On the Use of the Dual Process Langmuir Model for Correlating Unary and Predicting Mixed Gas Adsorption Equilibria" *Langmuir* 27 (2011) 4700-4712.
Ruthven, et al. "Swing Adsorption" *VCH Publishers* (1994).
Samanta, et al. "Post-Combustion $CO_2$ Capture Using Solid Sorbents: A Review" *Ind. Eng. Chem. Res.* 51 (2012) pp. 1438-1463.
Sanz-Perez, et al. "Direct Capture of $CO_2$ from Ambient Air" *Chem. Rev.* 116 (2016) pp. 11840-11876.
Subramanian, et al. "Equilibrium Theory for Solvent Vapor Recovery by Pressure Swing Adsorption: Analytic Solution for Process Performance" *Chem. Eng. Sci.* 52 (1997) pp. 3147-3160.
Xiao, et al. "Capture of $CO_2$ from flue gas streams with zeolite 13X by vacuum pressure swing adsorption" *Adsorption* 14 (2008) pp. 575-582.
Zhang, et al. "Effect of flue gas impurities on $CO_2$ capture performance from flue gas at coal-fired power stations by vacuum swing adsorption" *Energy Procedia* 1 (2009) pp. 1115-1122.
Zhang, et al. "Effect of process parameters on power requirements of vacuum swing adsorption technology for $CO_2$ capture from flue gas" *Energy Con. Manag.* 49 (2008) pp. 346-356. (Abstract only).

* cited by examiner

REMOVAL OF WATER VAPOR FROM STREAMS CONTAINING CARBON DIOXIDE AND/OR CARBON MONOXIDE

CROSS REFERENCE TO RELATED APPLICATION

This application claims filing benefit of U.S. Provisional Patent Application Ser. No. 62/695,450, having a filing date of Jul. 9, 2018, which is incorporated herein by reference for all purposes.

FEDERAL RESEARCH STATEMENT

This invention was made with Government support under Grant No. DE-FE0007639, awarded by the Department of Energy, and under Grant No. NNM12AA41C, awarded by NASA. The Government has certain rights in the invention.

BACKGROUND

Carbon dioxide ($CO_2$), a seemingly harmless and relatively inert gas, is everywhere. It is produced by every type of industrial combustion process. Power generation is considered the largest industrial producer of $CO_2$, but other industries, such as the iron and steel industry, also produce large quantities of $CO_2$, as well as carbon monoxide (CO) and hydrogen ($H_2$). $CO_2$ is also produced in many chemical processes, in addition to traditional combustion processes (e.g., power generation). $CO_2$ released from transportation, industrial processes, and especially the electric power industry has been implicated and widely accepted as being a cause of climate change. Beneficially, CO can be used as a fuel. For environmental purposes, as well as recovery of a useful fuel source, gas separations technology has great interest in improving the separations methodologies for streams containing CO and/or $CO_2$.

Early $CO_2$ separations included those carried out in the recovery of $H_2$ from steam methane reforming and in the removal of $CO_2$ from natural gas ($CH_4$). More recently, the largest effort in $CO_2$ separations has perhaps been associated with the removal of $CO_2$ from the flue gas of coal fired power plants. Adsorption technology, especially pressure swing adsorption (PSA), has been proposed and studied extensively for this purpose. To circumvent climate change due to an increase in atmospheric $CO_2$, the gas separations community has also been investigating the capture and concentration of $CO_2$ from air, mainly, but not exclusively, by adsorption technology.

Unfortunately, conventional PSA processes make inefficient use of applied energy, at least in part due to the presence of water vapor in streams containing $CO_2$ and/or CO. The presence of water vapor in the feed streams has a negative effect on the performance of most PSA adsorbents by reducing their capacities, which serve to lower the production capability of the systems. For example, water vapor adsorbs irreversibly on molecular sieve zeolites, like 13× zeolite, effectively poisoning the adsorbent over time. Yet, 13× zeolite remains as the adsorbent of choice in a PSA process for low pressure streams containing $CO_2$ and/or CO. As such, PSA for use in separating streams containing $CO_2$ and/or CO possibly including some $H_2$ has generally remained economically unfeasible over alternative competing technologies (e.g., amine scrubbing), even though it presents an environmentally friendly alternative.

What are needed in the art are PSA systems that include economical and efficient removal of water vapor from streams prior to the PSA separation process. Methods that can provide high purity $CO_2$ and/or CO and/or $H_2$ products from a water vapor-containing feed stream could be particularly beneficial in many applications.

SUMMARY

According to one embodiment, disclosed is a method for separating water vapor from a gas stream. A method can include supplying a feed gas stream to a desiccant dryer, e.g., a rotary wheel dryer comprising one or more desiccant wheels. A method can also include supplying a regenerating stream to the desiccant dryer. The regenerating stream can include light product from a PSA process that is downstream of the desiccant dryer. The method can also include supplying thermal energy to the water vapor removal process through, e.g., heating the desiccant dryer directly or heating at least a portion of the regenerating stream. The method can provide an economical approach to water vapor removal and recovery of targeted components of a gas stream, e.g., in $CO_2$ and/or CO recovery, particularly when the energy source for the heating step is an inexpensive source, e.g., waste heat from a steel mill, power plant, or other industrial process.

Also disclosed is a PSA system that includes a water vapor removal process upstream of the PSA process. The system includes a desiccant dryer and a PSA bed in fluid communication with the desiccant dryer. Specifically, the two are in fluid communication with each other such that a dry feed gas exiting the desiccant dryer is fed to the pressure swing adsorption bed and at least a portion of a light product off of the pressure swing adsorption bed is fed to the desiccant dryer as at least a component of a regenerating stream. In addition, the system includes a heat source that provides thermal energy to the desiccant dryer and/or to at least a portion of the regenerating stream. The heat source can also provide the feed gas to the system. For instance, the heat source can be an industrial process that generates excess heat for use as the heat source and also generates a flue gas that is provided as the feed gas to the PSA system.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
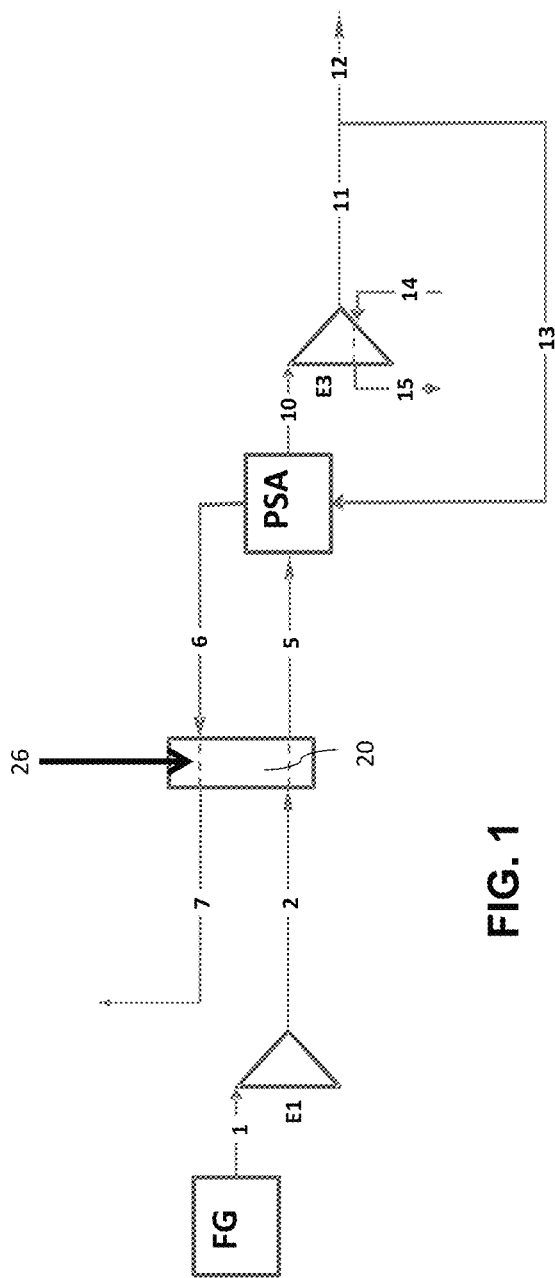
FIG. 1 illustrates a water vapor removal process including a single dehumidifier.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, disclosed are methods and systems for removing water vapor from a feed gas prior to further processing the feed gas according to a downstream PSA process. For instance, in one embodiment, the feed gas can include $CO_2$ and/or CO and/or $H_2$, and the PSA process can be used to separate components of the feed gas from one another. More specifically, the methods and systems are designed such that light product off of a PSA process is utilized to regenerate desiccant of a water vapor removal process, the water vapor removal process being carried out prior to the feed gas entering the PSA process. In addition, the water vapor removal process can be heated by providing thermal energy directly to a desiccant dryer and/or by providing thermal energy to a regenerating stream that regenerates desiccant of the dryer.

While disclosed methods can be beneficially utilized in any $CO_2$, CO, and/or $H_2$ separation process, they can be particularly beneficial for use when systems include a low-cost energy source for providing heat to the water vapor removal process. In one embodiment, the thermal energy is provided from the same process that provides the feed gas. For instance, the feed gas can include a $CO_2$ and/or CO-containing flue gas from an industrial process (e.g., a power plant, a steel mill, etc.) and waste heat from the industrial process can be used to provide thermal energy to the water vapor removal process. Through utilization of such a low-cost heat source, the process can provide a highly economical and efficient approach for $CO_2$, CO, and/or $H_2$ recovery.

FIG. 1 schematically illustrates one embodiment of a system. As shown, a feed gas (FG) can be carried in a flow 1 to a feed blower E1 and thence the FG flow 2 can proceed to a desiccant dryer 20. The FG can be any gaseous stream that includes $CO_2$ and/or CO and/or $H_2$ for separation and recovery. The FG may also include other components such as $CH_4$, $N_2$, alkanes and/or alkenes. In one embodiment, the FG can be very dilute in $CO_2$ (e.g., about 1 vol. % or less total $CO_2$ content, or about 0.5 vol. % or less in some embodiments). However, higher content $CO_2$ streams are also encompassed herein.

The FG can be derived from operations that produce one or both of $CO_2$ and CO in any quantity and in any proportion to one another. For example, a FG can be derived from an industrial process that produces proportionally larger quantities of $CO_2$ as compared to CO, including, and without limitation to, flue gas streams in power generation (e.g., coal fired power plants), waste gas streams in chemical processes, etc.

In one embodiment, the FG can be derived from an industrial process that produces relatively large quantities of CO, including, and without limitation to, exhaust gas streams from steel mills, gaseous streams derived from mining operations (e.g., underground mining environmental air treatment), off-gas streams derived from internal combustion or other low efficiency combustion operations, syngas treatment, etc. For instance, a system can be utilized in treatment of water gas to separate CO from $H_2$, in treatment of producer gas to separate CO from $N_2$, or in electrolysis processes to separate CO from 02, among others.

The FG flow 2 can communicate with a desiccant dryer 20. The desiccant dryer 20 uses a regenerable desiccant to remove water vapor from the FG. A desiccant dryer 20 can include multiple beds loaded with a desiccant material so as to deliver a continuous stream of dry FG in a dry flow 5 to the downstream PSA process. By inclusion of multiple beds, one (or more) beds can be on-line and in fluid communication with the FG input flow 2 and removing water vapor therefrom, and simultaneously, one (or more) beds can be in fluid communication with a regeneration stream 6 that serves to regenerate the desiccant for further operation.

Figure 2:
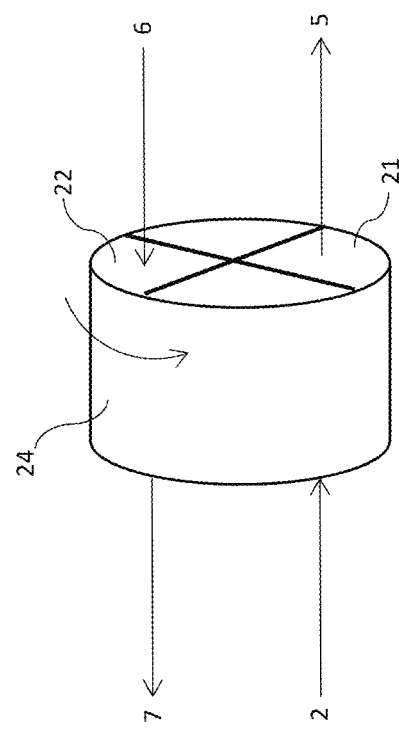
FIG. 2 schematically illustrates a desiccant wheel as may be utilized in one embodiment of a water vapor removal process.

Any type of desiccant dryer 20 can be utilized in the water vapor removal process. In one embodiment, a rotary wheel dryer incorporating a desiccant wheel 24 as illustrated in FIG. 2 can be used. A rotary wheel dryer can include a desiccant material in a first bed 21 and in a second bed 22 that are located on a wheel 24. The first bed 21 is locatable in a path that intersects with the FG flow 2 in an on-line step, and the second bed 22 is simultaneously locatable in a path that intersects with the regeneration stream 6 in a regeneration step. The desiccant material in the first bed 21 that is at the on-line position removes water vapor from the FG flow 2, while the regenerating stream 6 flows through the desiccant material in the second bed 22 that is at the regeneration position to remove water vapor from the desiccant material. During use, the wheel 24 can continuously rotate as indicated by the directional arrow to move the desiccant material within the beds 21, 22 to the on-line position and the regenerating position. Of course, any of various types of desiccant wheels can be used in a process, and a desiccant wheel is not limited to the illustrated embodiment.

Desiccant included in a desiccant dryer can include any suitable material for preferentially adsorbing water vapor from the FG stream. Desiccants can include, for example, inorganic species like zeolites, alumina and silica gels, and organic species such as activated carbon, which can be of benefit in processing an input stream having high concentrations of water vapor in the FG. Such desiccants can have high water adsorption capacities and favorable water adsorption isotherm shapes. For instance, the water adsorption capacity of the desiccant can be from about 20 wt. % to about 50 wt. % in some embodiments. Use of a high capacity desiccant can decrease the amount of desiccant necessary for drying, can decrease the size and number of desiccant wheels in the dryers, and/or increase the cycle time (and thus decrease cycling between beds) for the water vapor removal system. Useful desiccants can also have water adsorption isotherms that are concave to the pressure axis, particularly at low pressure, which can help in forming short, sharp mass transfer zones.

During use, when an on-line adsorption bed becomes charged with water vapor (typically after about 2-5 minutes), the inlet FG flow 2 is switched (e.g., via rotation of a desiccant wheel) to another bed of the dryer. In those embodiments in which the water vapor removal system includes a pressure swing component, the water vapor-charged bed can also be rapidly depressurized to release a portion of the adsorbed water vapor as the regenerating stream 6 is directed into the water vapor-charged bed. As the regenerating stream 6 passes through the charged adsorption bed (e.g., bed 22 in FIG. 2), it strips away water from the desiccant, thereby regenerating the bed 22 for the next cycle, with the exit stream 7 carrying the stripped water vapor. The exit stream 7 can be simply vented or can be further processed, depending upon the specific application and the contents of the exit stream 7.

As indicated in FIG. 1, the regenerating stream 6 can include all or a portion of the light product off of the downstream PSA process. The light product can contain essentially no $CO_2$ (e.g., less than about 0.01 vol. %) and essentially no water (e.g., less than about 0.01 vol. %). For instance, the regenerating stream 6 can include all or a portion of a light product stream that is concentrated in CO with essentially no $CO_2$. In one embodiment, the regenerating stream 6 can include a light product CO stream that may also contain some $H_2$.

In addition to utilization of all or a portion of the very dry light product off of the downstream PSA process, the water vapor removal system can include the addition of heat for regeneration of a dryer bed. For instance, in the embodiment illustrated in FIG. 1, thermal energy 26 can be added directly to the dryer itself, for instance, by heating a desiccant wheel, for example by locating a heating element in close proximity to the regeneration step of a desiccant wheel. The addition of heat to a bed can allow for decrease in the size of the adsorption beds (e.g., the desiccant wheel) and can also or alternatively allow for the on-line adsorption beds to be loaded to a higher level, as the addition of heat facilitates water vapor removal and bed regeneration from a more highly loaded desiccant.

The added thermal energy to the water vapor removal system is not limited to direct addition of the energy to the dryer. In another embodiment, illustrated in FIG. 3, a system can include a heat exchanger 28 in line with the regenerating stream 6 that can include an inlet flow 16 and outlet flow 17, as shown. The heated inlet flow 16 can optionally be heated by use of a low-cost energy source, such as by use of waste heat from an industrial process as described above.

In one embodiment, the water vapor removal process can also include pressure variation across the desiccant beds in conjunction with the addition of heat during the regeneration step. For instance, the water vapor removal process can incorporate pressure temperature swing adsorption (PTSA) in which the pressure of a bed is varied between the on-line water vapor removal step and the regenerating step in conjunction with addition of thermal energy to the bed for more efficient regenerating. In another embodiment, the water vapor removal process can include a temperature swing adsorption process (TSA) with no swing in pressure, in which the bed is maintained at constant pressure (e.g., ambient) during both the on-line step and the regenerating step. In either embodiment, a process can include heat added to the bed in conjunction with the dry regenerating stream 6 during the regenerating of the bed, as indicated in FIG. 1, and/or can include addition of heat to the regenerating stream 6 by use of a heat exchanger to the system, as indicated in FIG. 3.

To further improve the efficiency of a system, in one embodiment, the heat source used to provide thermal energy to the water vapor removal process can be a low-cost energy source. For instance, thermal energy can be provided to the water vapor removal system from the system that also provides the feed gas. For example, otherwise waste heat of an industrial process, such as a steel mill, power plant, etc., can be captured and utilized to provide the thermal energy 26 to the desiccant dryer, as indicated in FIG. 1, and/or to heat the inlet stream 16 of a heat exchanger, as indicated in FIG. 3.

Figure 3:
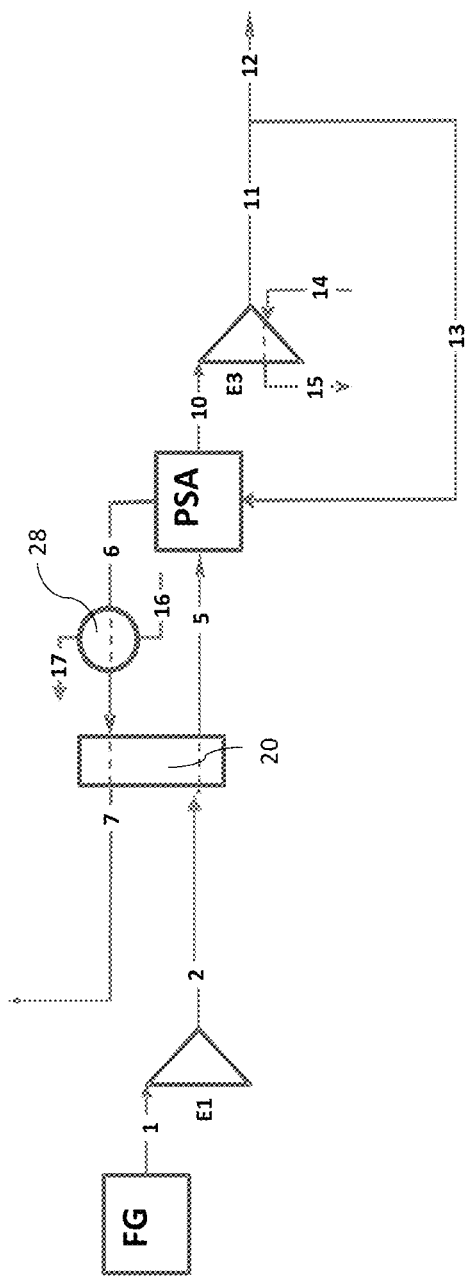
FIG. 3 illustrates another water vapor removal process including a single dehumidifier.

As indicated in FIG. 1 and FIG. 3, through the utilization of dry light product off of the PSA process in the regenerating stream 6 in conjunction with the addition of thermal energy to the water vapor removal process, in one embodiment, the water vapor removal process need only include a single desiccant dryer 20.

Figure 4:
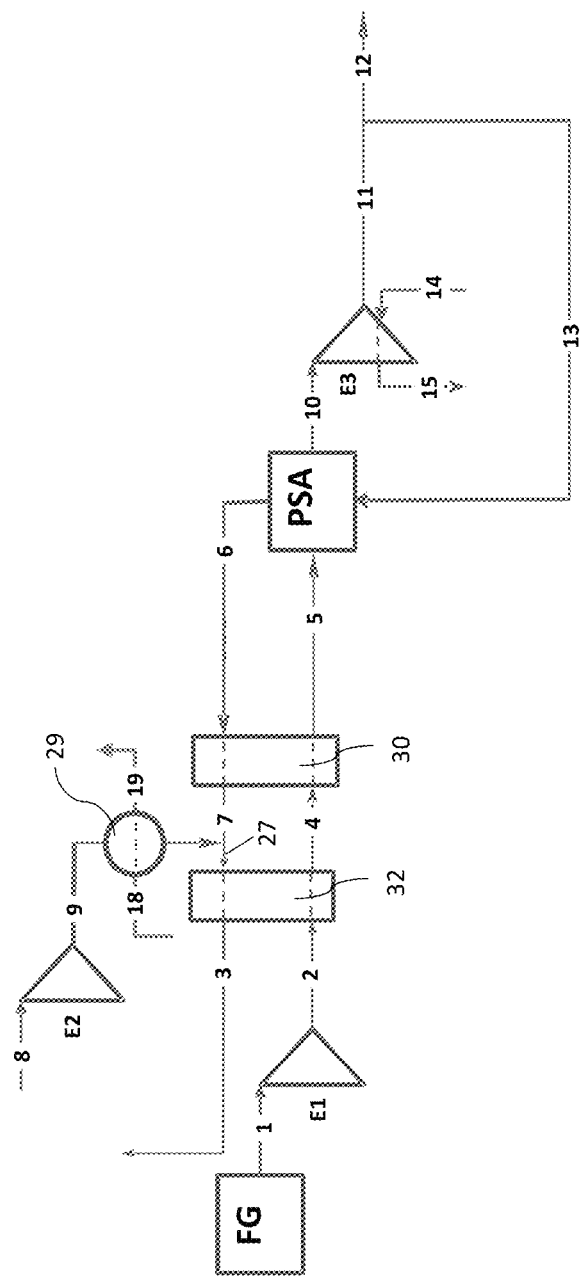
FIG. 4 illustrates a multi-dehumidifier water vapor removal process.

In other embodiments, multiple dryers can be included in the water vapor removal process. By way of example, FIG. 4 illustrates a system in which the water vapor removal system includes a first dryer 30 and a second dryer 32. In this embodiment, the regenerating stream 6 can be provided to the first dryer 30 for regenerating desiccant, as described above for a single dryer system. The exit stream 7 can proceed to the second dryer 32. The exit stream 7 can be combined with ambient air 9 prior to proceeding to the second dryer 32, as a second regenerating stream 27. As shown, in this embodiment, thermal energy can be added to the water vapor removal system through inclusion of a heat exchanger 29 in fluid communication with a heated inlet flow 18 and an outlet flow 19, as well as with the air flow 9 provided from ambient air flow 8 by use of a purge blower E2. The addition of heated air from the heat exchanger 29 to the exit stream 7 can thus provide an efficient regenerating stream 27 that is then directed to a regenerating step in the second dryer 32. This regenerating stream 27 can regenerate desiccant of the second dryer 32 as the FG flow 2 is contacting desiccant in an on-line step and water vapor is removed from the FG flow 2. The dry flow 4 that exits the second dryer 32 then proceeds as inlet flow to the first dryer 30, where it contacts desiccant in an on-line step, and additional water vapor is removed from the dry FG flow 4. The dry FG flow 5 that exits the first dryer 30 can then proceed as FG 5 to the downstream PSA process.

Meanwhile, the regenerating stream 27 contacts a charged adsorption bed in the second dryer 32, where it strips water away from the desiccant. The wet flow 3 that exits the second dryer 32 can then be vented, as indicated, or, depending upon the contents of the wet flow 3, can be further processed as desired.

Figure 5:
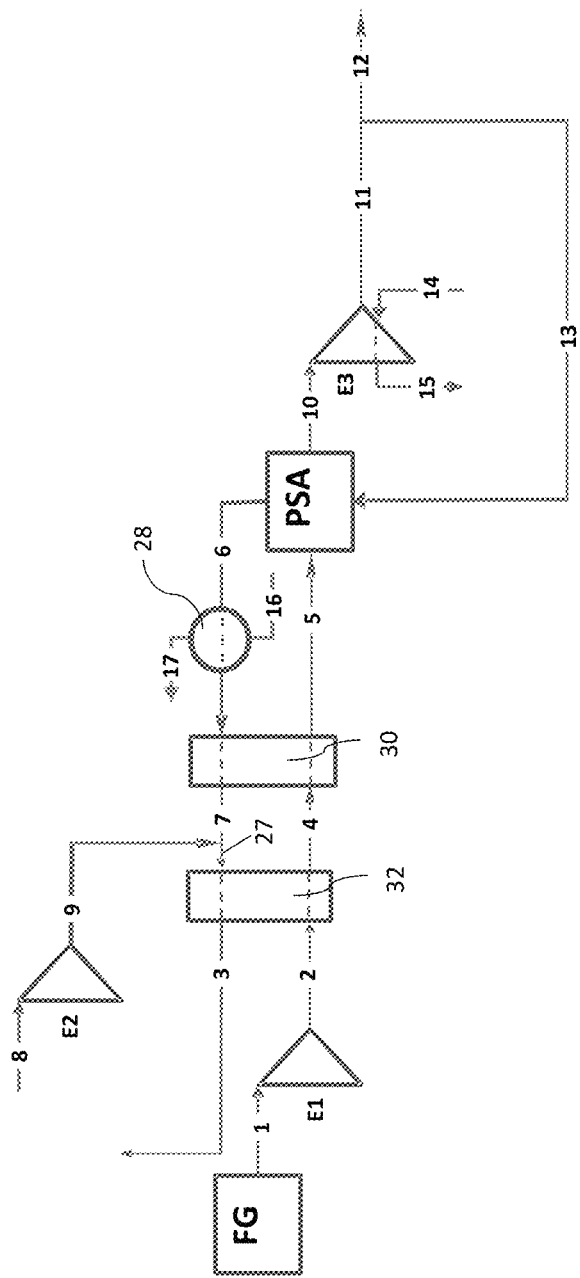
FIG. 5 illustrates another multi-dehumidifier water vapor removal process.

The location of a heat exchanger, as well as the number of locations of addition of thermal energy to the water vapor removal system, can be varied. For instance, in the embodiment illustrated in FIG. 5, a system can include a heat exchanger 28 in communication with the regenerating stream 6 upstream of the first dryer 30, rather than in communication with an ambient air flow 9 that is combined with the exit stream 7 to form the second regenerating stream 27.

Figure 6:
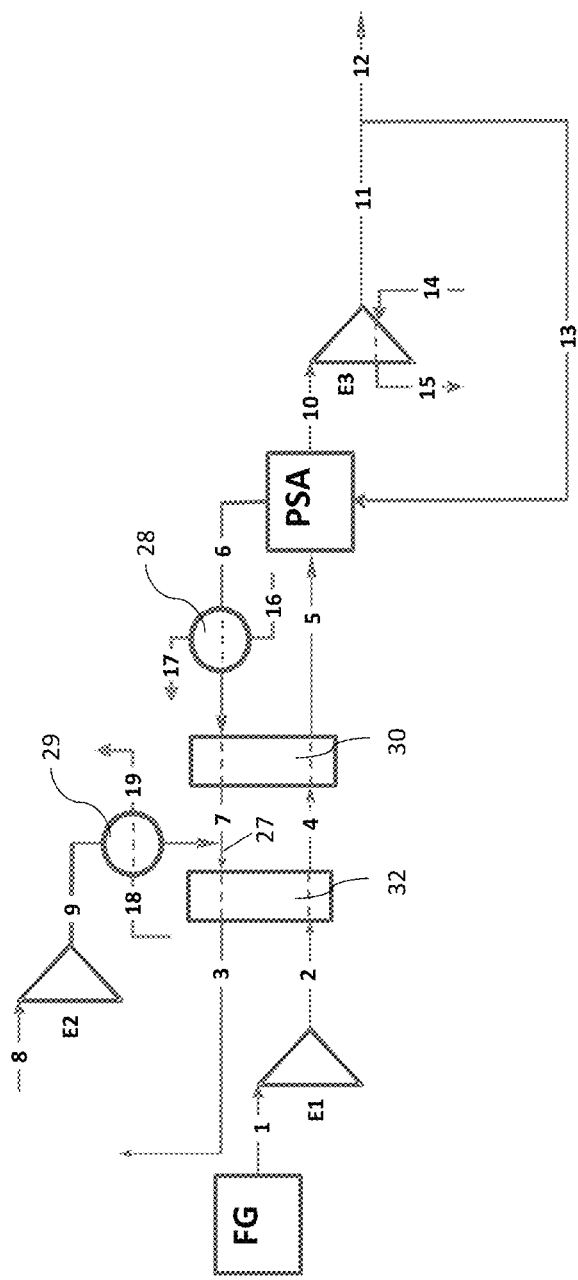
FIG. 6 Illustrates another multi-dehumidifier water vapor removal process.

In yet another embodiment, a water vapor removal system can include multiple dryers. For instance, in the embodiment illustrated in FIG. 6, a system can include a first heat exchanger 28 in communication with the regenerating stream 6 for the first dryer 30 and can also include a second heat exchanger 29 in communication with the ambient air flow 9 that is combined with the exit stream 7 to form the second regenerating stream 27.

Of course, all embodiments of the water vapor removal system can include additional input of thermal energy through the inclusion of additional heat exchangers for addition of thermal energy to fluids within the system and/or through the addition of thermal energy directly to dryers used in the system. Moreover, systems are not limited to two dryers, and additional dryers can be included as desired.

The dry FG formed by the water vapor removal process can be delivered to a PSA system that can be utilized in one embodiment to separate streams containing $CO_2$ and/or CO and/or $H_2$ from mixed gas feed streams. In one particular embodiment, disclosed methods and systems can be utilized in conjunction with a PSA process in CO separation protocols (e.g., steel mill and iron ore processing flue gas treatment). For instance, disclosed systems can provide extremely high content $CO_2$ and/or CO and/or $H_2$ product streams with a very high efficiency due to the low-cost water vapor removal process that provides an extremely dry feed stream to a PSA process.

In general, any PSA system can be utilized in conjunction with the water vapor removal process. In one embodiment, the PSA system can include at least two beds loaded with any suitable $CO_2$/CO adsorbent and, in general, can incorporate low temperature adsorbents (i.e., process conditions at about 100° C. or less).

Adsorbents for the PSA system can include, without limitation, a zeolite, an activated carbon, an activated alumina, a silica gel, a carbon-based or non-carbon-based molecular sieve, a metalorganic structure, one or more oxides or hydroxides of alkali or alkaline-earth metals, or a porous structure containing a substance capable of reacting reversibly with CO or $CO_2$ molecules, such as amines, physical solvents, metallic complexing agents, metal oxides, or hydroxides, for example.

Adsorbents can be provided in the PSA beds according to standard practice, e.g., packed particle bed adsorbents, particle coated parallel channel formations, or particles trapped in microfibrous mats, optionally provided in combination with other adsorbents in one or more layers within the bed. For instance, the beds can have a relatively high bed density, e.g., about 800 $kg/m^3$ or less, about 600 $kg/m^3$ or less, or about 400 $kg/m^3$ or less, in some embodiments, which can lower the energy requirements and increase throughput for the systems. In other embodiments, the beds can have a relatively low bed density, e.g., about 150 $kg/m^3$ or less, about 200 $kg/m^3$ or less, or about 250 $kg/m^3$ or less, in some embodiments, for instance from about 100 $kg/m^3$ to about 800 $kg/m^3$ in some embodiments.

Figure 7:
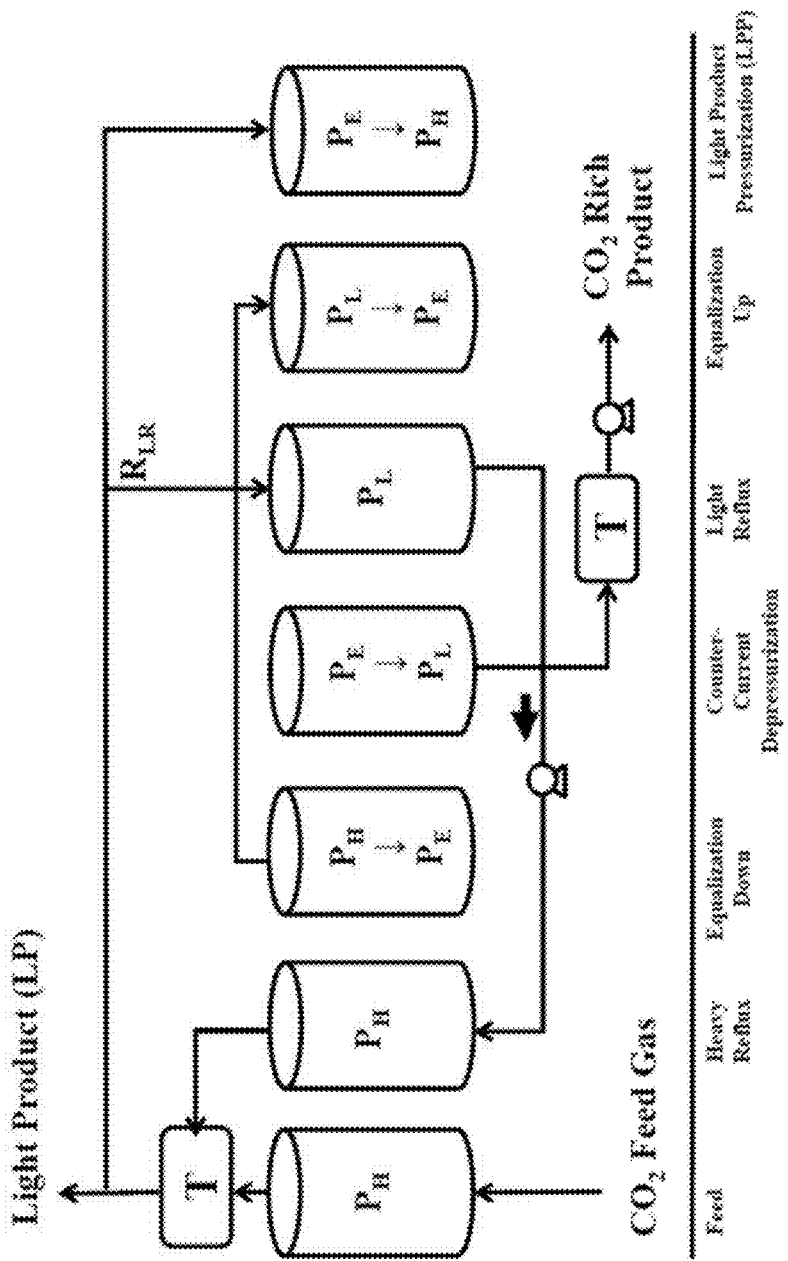
FIG. 7 illustrates one embodiment of a PSA process as can be utilized in conjunction with a water vapor removal process as described.
Figure 8:
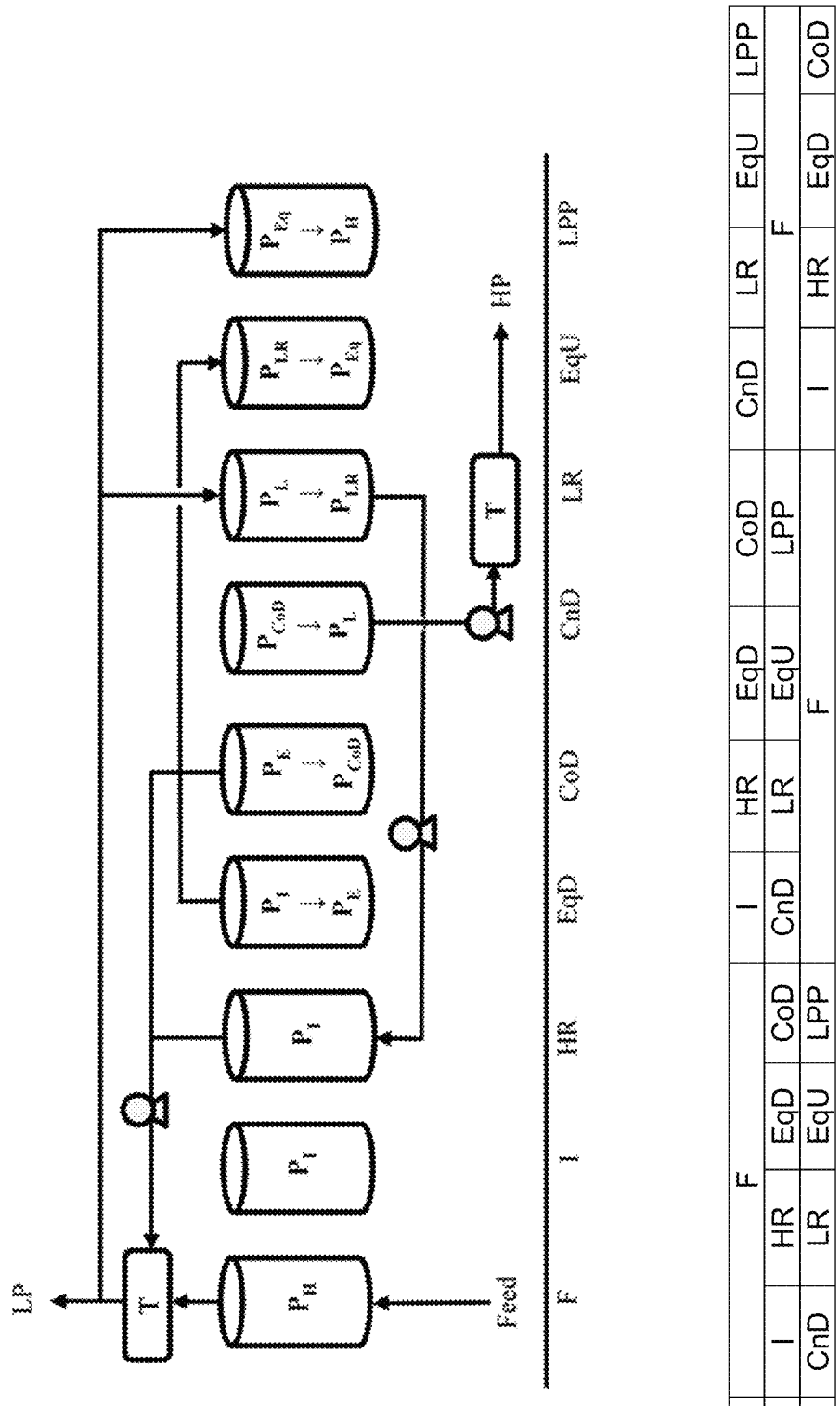
FIG. 8 illustrates another embodiment of a PSA process as can be utilized in conjunction with a water vapor removal process as described.

One embodiment of a PSA system as may be downstream of a water vapor removal process is illustrated FIG. 7, which describes a 3-bed, 7-step PSA cycle and FIG. 8, which describes a 3-bed, 9-step PSA cycle. A PSA process can generally include at least a feed (F) step, a light reflux (LR) step, and a counter-current depressurization (CnD) step, with additional steps often included for improved recovery. By way of example, a 7-step PSA process, as illustrated in FIG. 7, can include a feed step (F); a heavy reflux step (HR); equalization steps including EqD (decrease in pressure over the equalization) and EqU (increase in pressure over the equalization); a counter-current depressurization step (CnD); a light reflux step (LR); and a light product pressurization step (LPP). A 9-step PSA process, as illustrated in FIG. 8, can also include a co-current depressurization step (CoD) and an idle step (I).

During a PSA process, every bed in a system can undergo the same sequence of cycle steps, but with the cycles of each bed just out of phase with each other. For instance, while the cycles of the three beds illustrated in FIG. 7 and FIG. 8 are shown with each step correlated with one another, in use, each bed's cycle can be somewhat out of phase with one another.

The PSA cycle step sequence begins with the F step, during which adsorption of the heavy product is carried out at the highest pressure of the cycle ($P_H$). In general, $P_H$ of a system can be at or near atmospheric pressure, e.g., from about 1 atm to about 1.5 atm (e.g., from about 100 kPa to about 150 kPa), though higher pressures are possible. During this step, a light product (LP) is produced from the light end of the bed, which will contain much less $CO_2$ than in the feed stream. The feed (F) step is usually the main LP production step, and in one embodiment, all or a portion of the LP pulled off of the bed during this step can be delivered to the water vapor removal process. Optionally, the LP delivered to the water vapor removal process can include LP pulled off of the bed during other cycle steps, such as during an HR step and/or a CoD step.

The LP delivered to the water vapor removal process can be directly delivered from the PSA process or alternatively can be first delivered to a storage tank (T) and then metered to the water vapor removal process on a continuous or as-needed bases. As such, the system can include holding/pressurization/equalization tanks as are known in the art.

In one embodiment, the PSA process can be a continuous process, and as such, the FG flow 5 off of the water vapor removal process can be continuously directed to one of the beds of the PSA system. For instance, in a 3-bed embodiment, as illustrated in FIG. 7 and FIG. 8, the time of the feed step can be ⅓ of the total cycle period time for the bed, and following the feed step, the feed stream can be seamlessly switched to a second bed and so on, through an entire cycle.

Depending upon the characteristics of the feed stream and the desired pressure characteristics of the PSA cycle, some of the FG flow 5 may be used to initially pressurize the bed to $P_H$. For example, the feed stream can be initially utilized to pressurize the bed to $P_H$ prior to pulling any LP off of the bed during the F step.

By the end of the F step, there is still a significant amount of light product held up in the bed in the interparticle and intraparticle void spaces, and further steps of a cycle can be utilized to recover additional amounts of the light product.

In the embodiment illustrated in FIG. 8, the second step in the PSA cycle is the I step, where a bed has both of its ends closed, thereby remaining at the bed pressure (e.g., the highest pressure of the cycle $P_H$) and thus not performing any gas separation function. In other embodiments, e.g., as schematically illustrated in FIG. 7, the I step need not be included. Moreover, in other embodiments, a cycle can include an I step, but not immediately following the F step; this step may alternatively be placed in a more convenient location in the cycle. The I step can beneficially be utilized to maintain alignment of coupled steps in the cycle schedule. For example, as illustrated in the figures, the HR and LR steps can be coupled, and the location of the I step can retain the desired coupling.

The PSA cycle can also include a heavy reflux (HR) step and a light reflux (LR) step. As indicated in the figures, the HR and LR steps can be coupled to one another (i.e., off gases from a bed undergoing an LR step can be fed to a bed undergoing an HR step). During the HR step, a purge gas (generally either a heavy product stream or a stream enriched in the heavy product) is delivered to the heavy end (also referred to as the feed end) of the bed at a relatively high pressure (generally, though not necessarily at $P_H$).

The HR step, along with a CoD step (when present) can flush the weakly adsorbed species out of the bed co-currently, and thereby also fill the bed with the more strongly adsorbed species. The stream taken off of the light end during the HR step can be recycled back to another bed or taken off as LP and, thence, to the water vapor removal process.

The main role of the HR step is to produce a high purity heavy product (similar to distillation) by taking heavy product stream from another step, compressing it to a higher pressure, and cycling it to the bed for further concentration. While the HR step can take place at $P_H$, as indicated in FIG. 7, this is not a requirement of a system, and the HR step may also be carried out at some other pressure (e.g., Pi as indicated in FIG. 8). In one embodiment, heavy end feed to an HR step can be compressed to the desired pressure via a vacuum pump as illustrated.

A PSA cycle can include equalization steps, during which a bed can equalize in pressure (to $P_{Eq}$) with another bed. For example, as indicated in the figures, following the HR step, a bed can decrease in pressure by equalizing with another bed that is in a lower pressure stage of the cycle, e.g., following the LR step, which takes place at the lowest pressure of the cycle. This second bed can therefore increase in pressure, e.g., from the lowest cycle pressure (P L) up to $P_{Eq}$.

The equalization steps can be either bed-to-bed equalizations or bed-to-tank-to-bed equalizations. Typically, for every additional equalization step another adsorbent bed is required, possibly with the use of idle steps, unless a tank is used instead. Beneficially, equalization steps can conserve gas via recycle and can also conserve compression energy of the system. Moreover, equalization steps can help to flush the weakly adsorbed species out of the bed, thereby also filling the bed with the more strongly adsorbed species.

Another optional step in a PSA process is a CoD step, which is included in the 9-step process of FIG. 8 and can typically be between the HR step and the CnD step, and either prior to or following an EqD step. Inclusion of a CoD step (either with or without equalization steps) can be a useful step to include in some embodiments. For example, in some applications, the purity of the more strongly adsorbed component (i.e., $CO_2$) can be increased through inclusion of a CoD step. As indicated in the figures, the stream leaving the light end of the bed during a CoD step can be taken as LP, or optionally, it can be sent to another bed; for example, a bed undergoing the LR step, thereby providing some or all of its LR gas.

The CnD step can constitute the beginning of heavy product production. In general, the CnD step can follow the CoD step (when present). A CnD step can utilize a vacuum pump to decrease the pressure of a bed to $P_{CnD}$ through its heavy end with its light end closed. The gas leaving the heavy end of the bed during CnD can be taken as the heavy product (HP) as indicated. In one embodiment, the CnD step can be the only step that produces HP. In some embodiments, all or a portion of the CnD heavy end stream can be recycled; for instance, back to the HR step, and optionally, in conjunction with all or a portion of the heavy end stream off of an LR step.

The CnD step can be followed by an LR step. The LR step strips additional adsorbates from the adsorbent by decreasing their partial pressures. In addition, the low pressure of the step can also flush remaining adsorbates from adsorbent voids. In one embodiment, the LR step is carried out at the lowest pressure (P L) in the PSA cycle. In other embodiments, the CnD step can be carried out at the lowest pressure in the PSA cycle. For instance, the bed undergoing the LR step may increase slightly in pressure (to PLR) as compared to the bed pressure during the previous CnD step due to the gas entering the light end of the bed.

As indicated in the figures, the light end input to the bed during the LR step can include LP from the F step, or gas from the CoD step as mentioned above. In the illustrated embodiments, the LR step can begin toward the end of CnD or immediately afterward.

Following the LR step, a bed begins re-pressurization back to $P_H$ to begin the cycle again. The re-pressurization step(s) can include one or more EqU steps followed by light product pressurization (LPP) or optionally by feed pressurization (FP). With the F step following LPP, the PSA cycle step sequence can repeat indefinitely.

While certain embodiments of the disclosed subject matter have been described using specific terms, such description is for illustrative purposes only, and it is to be understood that changes and variations may be made without departing from the spirit or scope of the subject matter.

What is claimed is:

1. A method for separating water vapor from a gas stream, comprising:
    contacting a feed gas stream with desiccant contained in a first desiccant dryer, water vapor contained in the feed gas being adsorbed by the desiccant upon the contact and thus forming a dry feed gas stream;
    conveying the dry feed gas stream to a pressure swing adsorption process;
    supplying a regenerating stream to the first desiccant dryer, the regenerating stream comprising a light product off of the PSA process; and
    supplying thermal energy to the first desiccant dryer and/or to the regenerating stream.

2. The method of claim 1, wherein the feed gas stream is an off-gas from an industrial process.

3. The method of claim 2, wherein the thermal energy is provided from the industrial process.

4. The method of claim 2, wherein the industrial process is a power plant or a steel mill.

5. The method of claim 1, wherein the first desiccant dryer is a rotary wheel dryer.

6. The method of claim 1, wherein the feed gas comprises one or more of $CO_2$, CO, and $H_2$.

7. The method of claim 1, wherein the thermal energy is utilized to heat the first desiccant dryer.

8. The method of claim 1, wherein the thermal energy is utilized to heat at least a portion of the light product off of the PSA process.

9. The method of claim 1, wherein the regenerating stream is ambient air.

10. The method of claim 9, wherein the thermal energy is utilized to heat the ambient air.

11. The method of claim 1, further comprising prior to contacting the feed gas stream with the desiccant, contacting a wet feed gas stream with a desiccant contained in a second desiccant dryer that is upstream of the first desiccant dryer, water vapor contained in the wet feed gas being adsorbed by the desiccant upon the contact and thus forming the feed gas stream.

12. A pressure swing adsorption system comprising:
    a first desiccant dryer;
    a pressure swing adsorption bed in fluid communication with the first desiccant dryer such that a dry feed gas exiting the first desiccant dryer is fed to the pressure swing adsorption bed and at least a portion of a light product off of the pressure swing adsorption bed is fed to the first desiccant dryer as at least a component of a regenerating stream; and
    a heat source configured to heat at least a portion of the desiccant dryer and/or to heat at least a portion of the regenerating stream.

13. The pressure swing adsorption system of claim 12, wherein the first desiccant dryer comprises a rotary wheel dryer.

14. The pressure swing adsorption system of claim 12, further comprising one or more additional pressure swing adsorption beds in fluid communication with the first desiccant dryer.

15. The pressure swing adsorption system of claim 12, further comprising a heat exchanger in thermal communication with the heat source, the heat exchanger being in-line with all or a portion of the regenerating stream.

16. The pressure swing adsorption system of claim 15, further comprising one or more additional heat exchangers in thermal communication with the heat source.

17. The pressure swing adsorption system of claim 12, wherein the heat source is in fluid communication with the first desiccant dryer such that the heat source is configured to provide a feed gas to the first desiccant dryer.

18. The pressure swing adsorption system of claim 12, further comprising a second desiccant dryer in series with the first desiccant dryer.

19. The pressure swing adsorption system of claim 12, wherein the heat source is an industrial process.

20. The pressure swing adsorption system of claim 19, wherein the industrial process is a power plant or a steel mill.

* * * * *